US012226363B1

(12) United States Patent
Fulkerson

(10) Patent No.: US 12,226,363 B1
(45) Date of Patent: Feb. 18, 2025

(54) SAFETY WALKER WITH FALL SUPPORT AND TORSO SUPPORT ASSEMBLY

(71) Applicant: Safety Walker LLC, Scottsdale, AZ (US)

(72) Inventor: Michel Fulkerson, Scottsdale, AZ (US)

(73) Assignee: Safety Walker LLC, Flagstaff, AZ (US)

( * ) Notice: Subject to any disclaimer, the term of this patent is extended or adjusted under 35 U.S.C. 154(b) by 346 days.

(21) Appl. No.: 17/872,657

(22) Filed: Jul. 25, 2022

Related U.S. Application Data

(60) Provisional application No. 63/225,103, filed on Jul. 23, 2021.

(51) Int. Cl.
*A61H 3/04* (2006.01)

(52) U.S. Cl.
CPC ....... *A61H 3/04* (2013.01); *A61H 2201/0173* (2013.01); *A61H 2201/0192* (2013.01); *A61H 2201/1619* (2013.01); *A61H 2201/1633* (2013.01); *A61H 2201/1635* (2013.01); *A61H 2201/1671* (2013.01); *A61H 2201/1676* (2013.01)

(58) Field of Classification Search
CPC .............. A61H 3/04; A61H 2201/0173; A61H 2201/0192; A61H 2201/1619; A61H 2201/1633; A61H 2201/1635; A61H 2201/1671; A61H 2201/1676; A61G 5/14; A61G 2203/70
See application file for complete search history.

(56) References Cited

U.S. PATENT DOCUMENTS 5,040,556 A 8/1991 Raines
5,058,912 A * 10/1991 Harroun .................. A61H 3/04 482/68
5,083,806 A 1/1992 Brown
5,255,697 A 10/1993 Grauer
(Continued)

FOREIGN PATENT DOCUMENTS

CN 204766386 U * 11/2015
CN 109793647 A * 5/2019
CN 218652881 U * 3/2023

OTHER PUBLICATIONS

English translation for CN-109793647-A (Year: 2019).*
English translation for CN-204766386-U (Year: 2015).*
English translation for CN-218652881-U (Year: 2023).*

*Primary Examiner* — James A Shriver, II
*Assistant Examiner* — Michael T. Walsh
(74) *Attorney, Agent, or Firm* — Invention To Patent Services; Alex Hobson

(57) ABSTRACT

A safety walker is configured to allow easy entry and exit and to provide supports to prevent falls from occurring by incorporating a fall support that extends from a front end centrally back to an extended end. The fall support is configured to extend between a person's legs as they walk within the open area of the safety walker. The safety walker may also have a torso support with a left torso arm and a right torso arm that are pivotably coupled with the support frame and configured to pivot or rotate around a person's torso. An exemplary safety walker has a left and a right hand support that extend along a left and right side of the support frame and a gate assembly that includes a front gate and a back gate that rotate to extend across a front end and back entry end, respectively.

12 Claims, 14 Drawing Sheets

(56) References Cited

U.S. PATENT DOCUMENTS

| | | | | | |
|---|---|---|---|---|---|
| 5,476,432 | A * | 12/1995 | Dickens | A61H 3/04 | |
| | | | | 482/67 | |
| 5,520,402 | A | 5/1996 | Nestor et al. | | |
| 7,568,712 | B2 | 8/2009 | Heam et al. | | |
| 8,720,914 | B1 * | 5/2014 | Heath | A61H 3/008 | |
| | | | | 280/87.021 | |
| 9,180,064 | B2 | 11/2015 | Prather | | |
| 9,278,042 | B2 * | 3/2016 | Osterhaus | A61H 3/04 | |
| 10,085,910 | B2 | 10/2018 | Fulkerson | | |
| 10,391,018 | B1 * | 8/2019 | Fitzwater | A61H 1/00 | |
| 2006/0254631 | A1 * | 11/2006 | Mullholand | A61H 3/008 | |
| | | | | 135/67 | |
| 2009/0242006 | A1 | 10/2009 | Warren | | |
| 2014/0296039 | A1 | 10/2014 | Shaw et al. | | |
| 2015/0238381 | A1 | 8/2015 | Swiniarski | | |
| 2018/0133094 | A1 * | 5/2018 | Helfer | A61H 3/04 | |

* cited by examiner

SAFETY WALKER WITH FALL SUPPORT AND TORSO SUPPORT ASSEMBLY

CROSS REFERENCE TO RELATED APPLICATIONS

This application claims the benefit of priority to U.S. provisional patent application No. 63/225,103, filed on Jul. 23, 2021; the entirety is hereby incorporated by reference herein.

BACKGROUND OF THE INVENTION

Field of the Invention

The invention relates to a safety walker having a fall support, a torso support assembly, a left and right hand support extending along the left and right side of the open area of the safety walk and a front and back gate that are pivotably coupled with the support frame and coupled together, wherein rotation of the front gate also rotates the back gate.

Background

Walkers, or mobility devices provide support for walking and often have hand rails extending from the front toward the back. However, these devices do not effectively prevent falls. A person using a walker can easily lose their footing and fall either backward out of the walker or downward onto the floor.

SUMMARY OF THE INVENTION

The invention is directed to a safety walker configured to allow easy entry and to provide supports to prevent falls from occurring. An exemplary safety walker of the present invention has a fall support that extends from the front end of the support frame, between the left and right sides, to an extended end. The fall support is configured to extend between a person's legs as they walk within the open area of the safety walker. The fall support will prevent the person from falling down onto the floor. A seat may be configured toward the extended end of the fall support and may be coupled with the fall support. The seat may be adjustable in height and a strap may extend from the seat and be coupled with a front portion of the movable support frame to catch a person when they fall and allow them to slide along the strap to the seat.

An exemplary safety walker of the present invention has a torso support with a left torso arm and a right torso arm that are pivotably coupled with the support frame and configured to pivot from an entry position to a support position, wherein the left and right torso arms are pivoted together around a person's torso. The torso support may aid in balance and prevent falling backwards, side to side, forward and down. An exemplary safety walker has a left hand support and a right hand support that extend along the length axis from a position proximal the front end of the support frame toward the back entry end of the support frame. Exemplary hand supports are fixed and do not rotate. A gate assembly has a front gate and a back gate that is configured to rotate from an entry position, wherein the back gate is rotated to an open position, such as up and out of the way of the back entry end to allow a person to enter through the back entry end, to a walking position, wherein the front and back gates are rotated to form a closure or barrier across the back entry end and front end of the open area. The front gate and the back gate are coupled together such that after entry into the open area, rotation of the front gates down to a walking position also rotates the back gate down across the back entry end. The safety walker may have a single gate assembly configured on either the left or right side or may have both a left gate assembly and a right gate assembly that extend a portion of the way across the front and back of the open area. In an exemplary embodiment, the gate assembly has a gate connector that connects the front gate with the back gate and this gate connector may extend through the hand support extension, wherein the hand support extension is a conduit. In an exemplary embodiment, the left and right hand supports or the hand support extensions form a conduit for the left gate connector and right gate connector, respectively, to extend therethrough. The gate connector may be the hand support but maneuvering of the safety walker while holding the hand support may result in the gates moving and rotating. The gate assembly may include the hand support and as mentioned the hand support may have a conduit for the gate connector to extend therethrough.

An exemplary safety walker has at least one front wheel and at least one back wheel and as described herein has a pair of front wheels and a pair of back wheels. The front wheels may be configured to rotate in any direction while the back wheels may be configured in fixed alignment with the length of the support frame.

An exemplary fall support may be adjustable in height and the support frame may have fall support apertures along a frame fall support extension to allow the fall support to move up and down with respect to the support frame. A pin or other retainer may be inserted into fall support aperture to secure the fall support in a fixed position to the support frame. A fall support may have a cushion extending along a top surface for comfort and to dampen the impact of a fall down onto the fall support. A fall support may extend along a length axis of the support frame and may be centrally configured between the left and right side of the support frame.

An exemplary safety walker may have a seat that is coupled to the fall support to provide a person a comfortable place to sit and rest when desired. The seat may be height adjustable and may have a seat post that is slidably engaged with the support frame or the fall support and a seat height retainer may fix the seat in a desired height. A seat may be coupled with the fall support by a seat post and the seat may be adjustable in height by a seat height retainer that may include a pin, that extends through an aperture in the seat post and is fixed in place by the support frame or a portion of the fall support, such as a cylinder coupled with the fall support.

A strap may extend from the seat or seat post or to the fall support under the seat and extend up to the front end of the movable support frame such as to a cross support of the front support frame. The strap may extend upwards from the seat to a the frame end of the strap to cause a person to slide down and back toward the seat should that person fall down onto the strap. The seat may be configured proximal to the extended end of the fall support, such as more that 50% of the length of the fall support back from the coupled end of the fall support, and preferably about 75% or more.

An exemplary torso support assembly may also be adjustable in height with respect to a floor and with respect to the support frame. A fall support coupler may have the left torso arm and the right torso arm coupled thereto and may be slidably engaged with the support frame. Each of the left and right torso arms may have a curved portion that is configured to extend around the torso of a person. The left and right torso arms may be coupled to the torso support coupler that is configured between the left and right sides of the support frame, and may be centrally located between the left and right sides. The torso support assembly may have an actuator that is used pivot or rotate the torso support arms toward each other, or may have a torso support lock that secures the left and right torso arms in a pivoted position. A person may enter the safety walker and then manipulate the torso support lock to an unlocked position, and then move the left and right torso supports to a desired location around their torso and then re-engage the torso support lock to retain the left and right torso arms in a fixed rotated position. The left and right torso arms may be configured between the front and back gates. With this configuration, the torso arms can pivot from an entry position to a walking position regardless of the position of the left and/or right hand supports.

An exemplary safety walker has a pivoting gate assembly comprising a front gate coupled to a back gate by a gate connector. The safety walker may have a single gate assembly that is configured on either the left or right side of the support frame, or may have both a left and a right gate assembly. A safety walker may have a single gate assembly with a front gate and a back gate that each extend substantially across the width of the open area, the distance between the back entry end of the support frame, such as about 60% of the width or more, about 75% of the width or more, about 80% of the width or more. The gate connector may extend through a conduit formed by the hand support extension. The front and back gates may extend orthogonally from the hand support extension such that in a walking position, they extend across the open area of the safety walker and form a gate in the front and across the back of the open area. A gap may be configured between the extended end of the left gate and the extended end of the right gate when in a walking position, wherein the gates extend horizontally across the open area of the safety walker. A gap may be a distance between the extended end of a left or right gate and an opposing hand support or a portion of the support frame. An exemplary gap may have a gap distance between the extended ends of the left gate and the right gate of no more than 20 cm, no more than 15 cm, no more than 10 cm, no more than 5 cm and any range between and including the gap distance values provided. These small gap distances may prevent a person walking in the safety walker from falling backward out of the safety walker or forward. The two opposing left and right hand gates may form a gate across the back and the front of the safety walker. The gates may also be used to guide the safety walker and may include a gate handle.

An exemplary safety walker may be configured for easy entry, wherein a person may rotate the gate assembly or assemblies by rotating the back gate or gates upward from a walking position to an entry position. A person may straddle the fall support as well as the seat and strap as they enter into the open area of the safety walker, between the left and right sides and between the front end and the back entry end. A person may rotate the front gate or gates down to a walking position after entering and getting positioned within the safety walker. This rotation of the front gate or gates down to a walking position or configuration also rotates the back gate or gates to prevent the person from falling backward out of the open area of the safety walker. A person may then unlock the torso support assembly to allow the left and right support arms to rotated together around the person's torso. The lock may be re-engaged when the torso support arms in a snug and secure position. A person may then use the hand support extensions and/or the front gate or gates to move and guide the safety walker. It is preferred that the users hold onto the left and right hand supports during walking to maneuver the safety walker.

A person having paralysis on one side of their body or having limited use of an arm may use a safety walker with a single gate extending from the functioning side of their body. The front and back gates in this case may extend to an extended end that has a gap with the opposing hand support or other portion of the movable support frame that is no more than gap distances provided herein.

An exemplary safety walker may have dimensions to allow movement in and through doorways, such as having a width from a left side to a right side of no more than about 100 cm, no more than about 92 cm, no more than about 80 cm, no more than about 65 cm, and any range between and including the values provided. Some of these values would allow the safety walker to maneuver through standard doorways.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
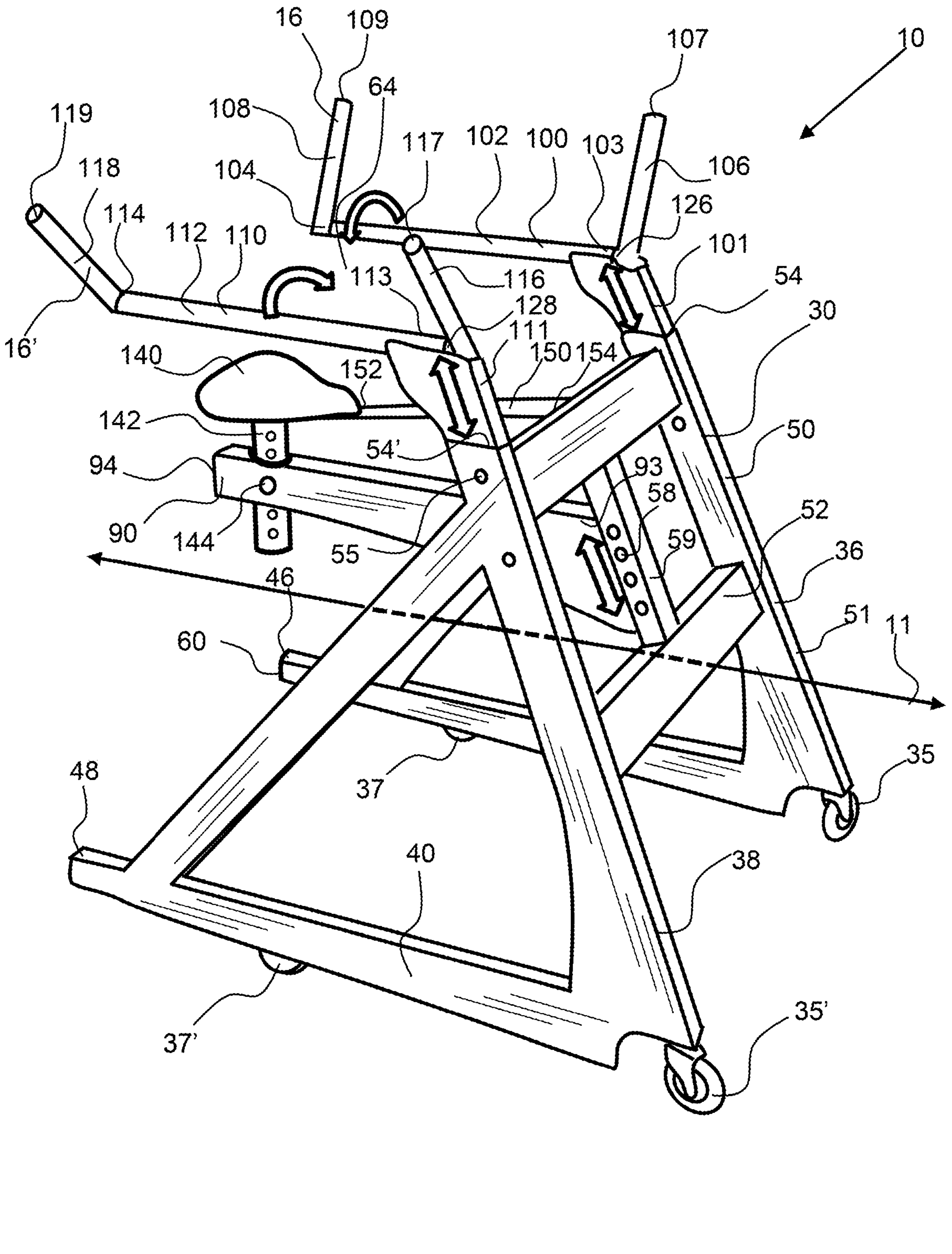
FIG. 1 shows a front side perspective view of an exemplary safety walker having a left and right hand support, and left and right gate assemblies.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
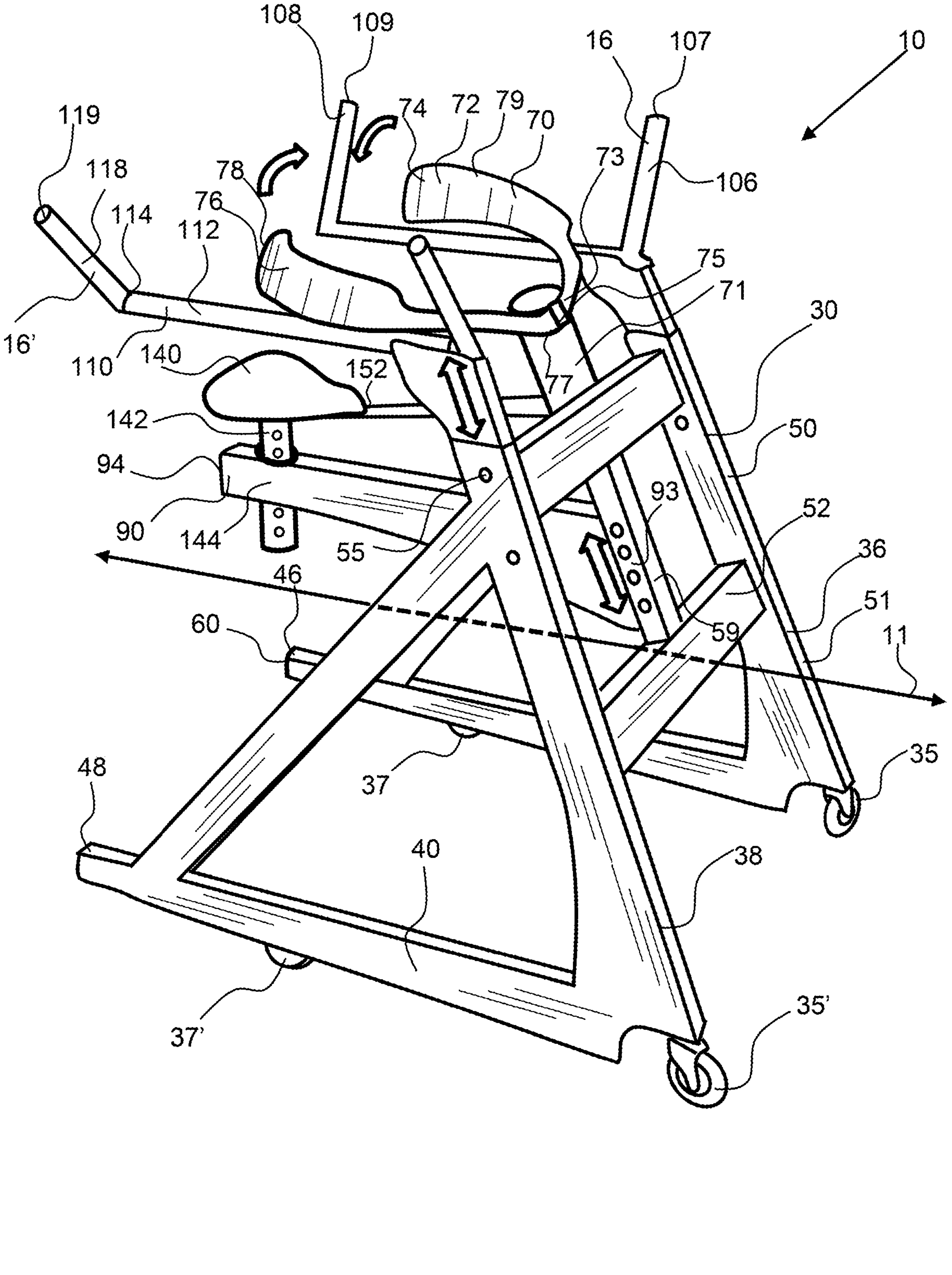
FIG. 2 shows a front side perspective view of an exemplary safety walker having a torso support assembly coupled to the front end of the support frame and comprising a left torso arm and right torso arm configured to pivot together around the torso of a person to provide support about the torso of the person.
Figure 3:
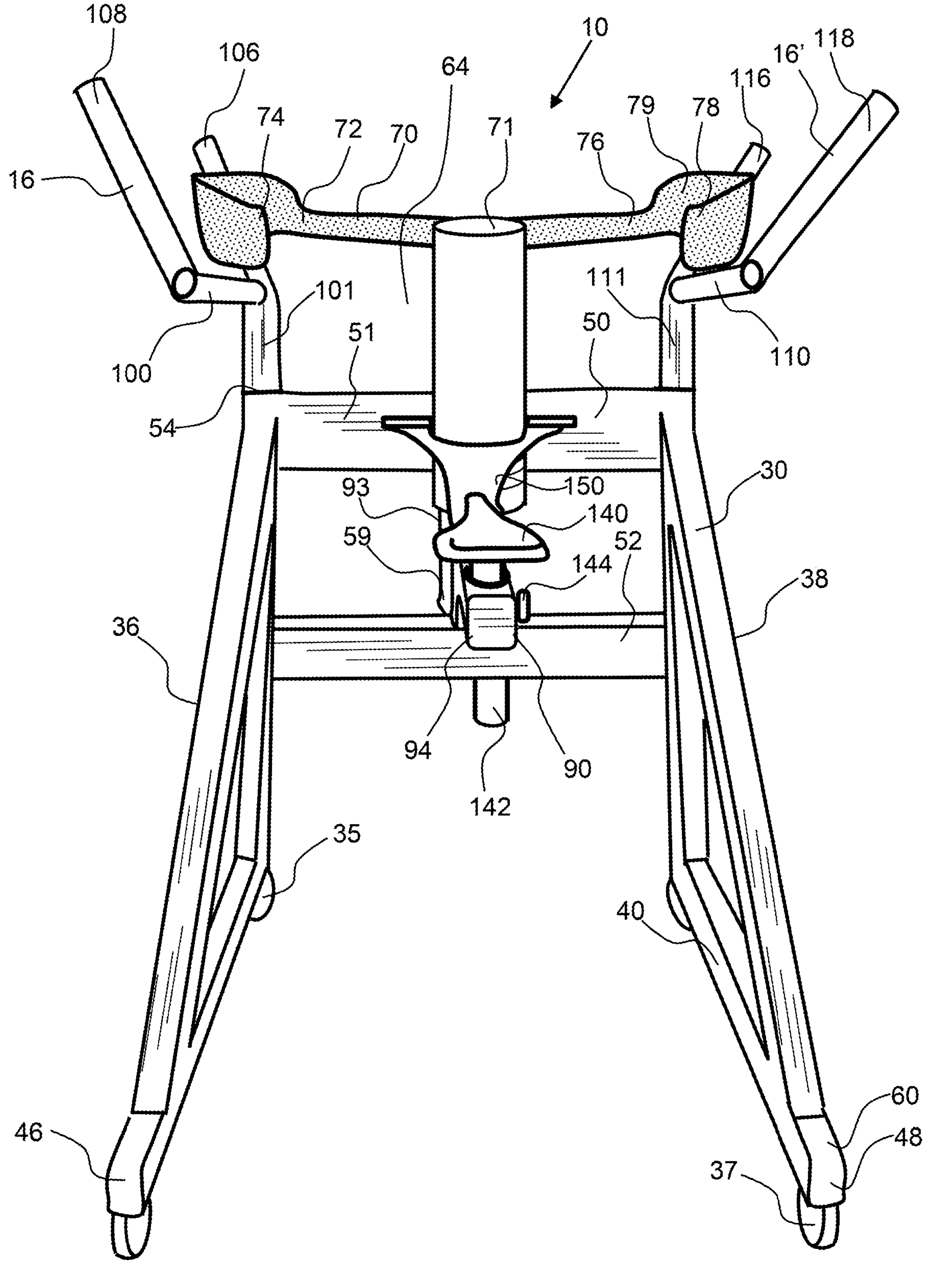
FIG. 3 shows a back perspective view of an exemplary safety walker having a torso support assembly coupled to the front end of the support frame and with both the left gate assembly and right gate assembly configured in an entry position.
Figure 4:
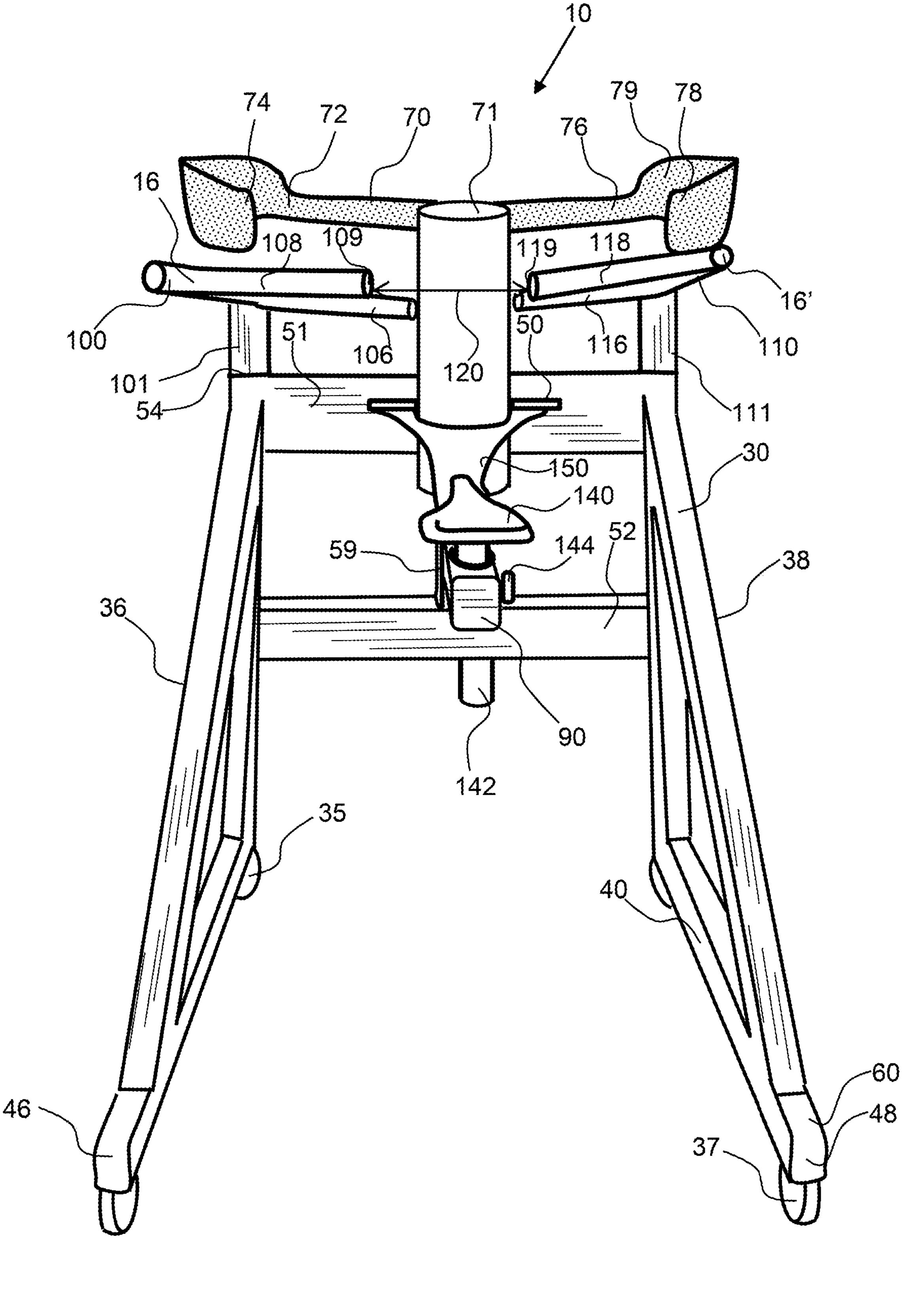
FIG. 4 shows a back perspective view of an exemplary safety walker having a torso support assembly coupled to the front end of the support frame and with both the left gate assembly and right gate assembly configured in a walking position with the extended ends of the gates proximal to each other with a gap distance between them.
Figure 5:
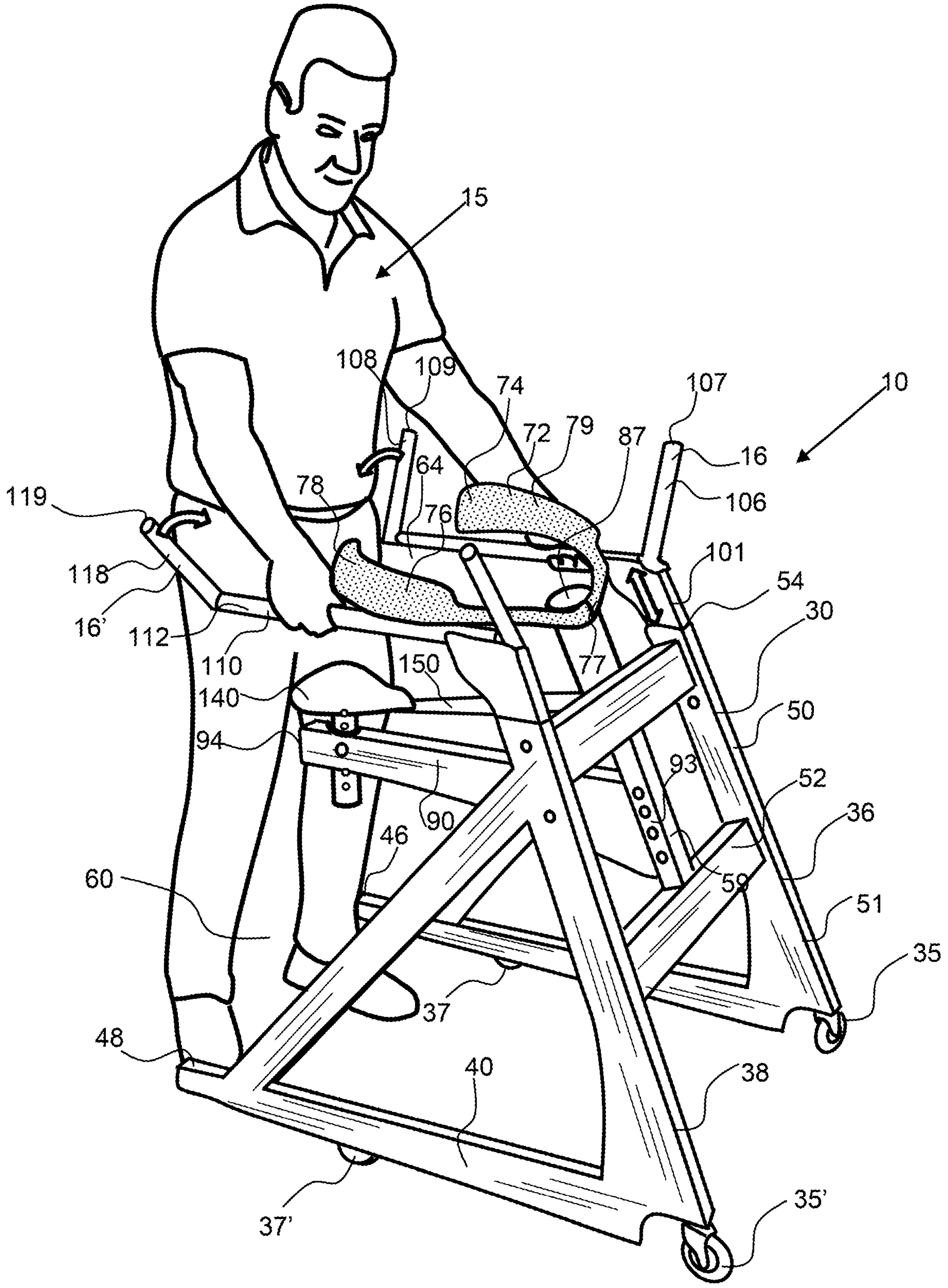
FIG. 5 shows a front side perspective view of the exemplary safety walker shown in FIG. 2, with a person entering through the back entry end of the support frame.
Figure 6:
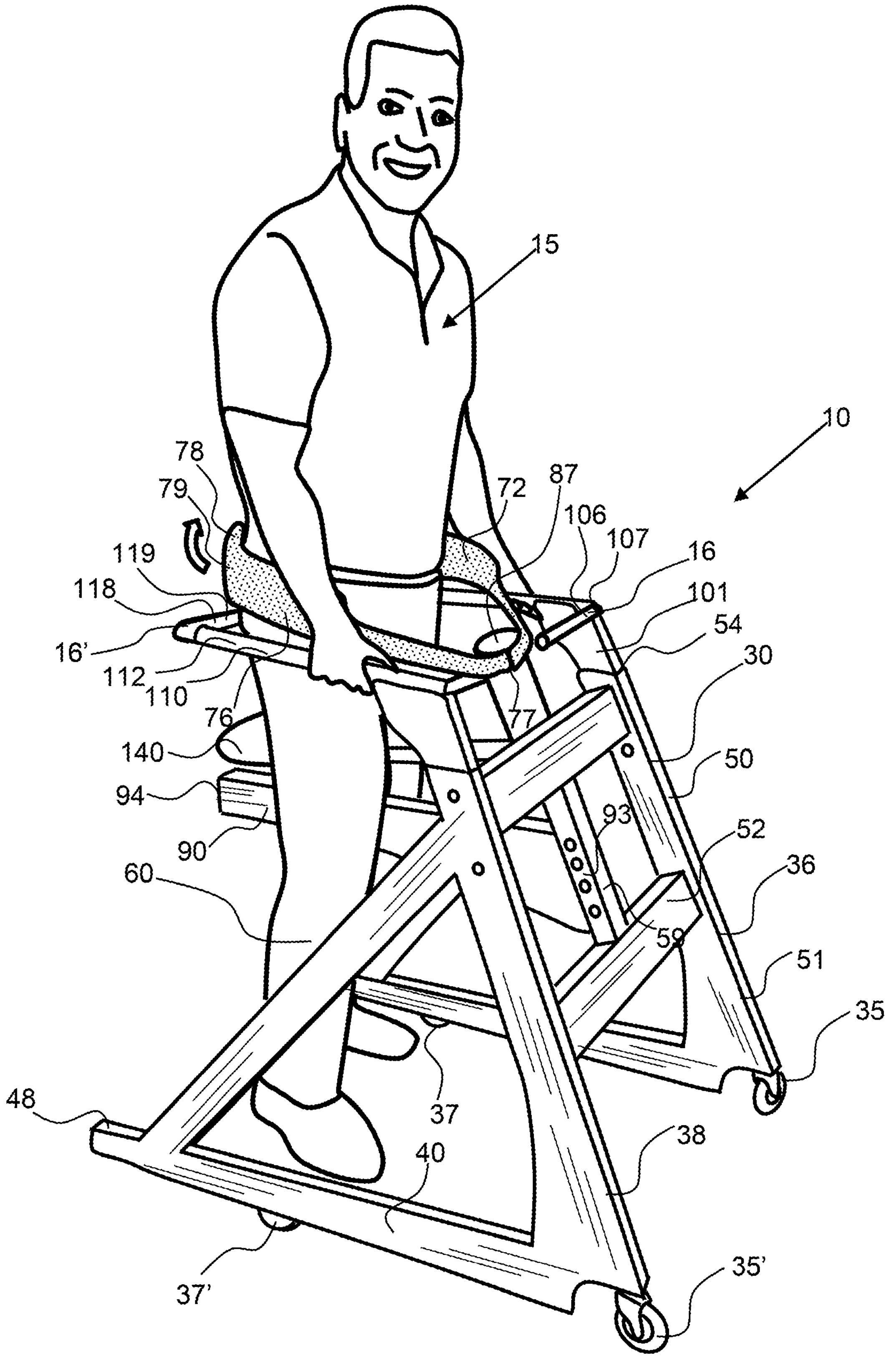
FIG. 6 shows a front side perspective view of the exemplary safety walker shown in FIG. 5, with the person now configured within the support frame and now rotating the left gate assembly and right gate assembly down to a walking position and with the torso support arms rotated about their torso for support.

Referring now to FIGS. 1 to 9. As shown in FIG. 1, an exemplary safety walker 10 has a left hand support 100 and a right hand support 110 that provide a convenient hand support for a person to hold onto as they walk and guide the safety walker. The left hand support has a left hand support extension 102 that extends from a left hand support coupled end 103, coupled with a left hand support frame coupler 101, to a left hand support extended end 104. The left hand support extension extends from the left hand support coupled end, coupled with the support frame proximal the front end 50, toward the back entry end 60. The left hand support extension may extend substantially parallel with the length axis 11 of the support frame. The length axis 11 of the support frame extends from the front end to the back entry end 60 and is preferably centered between the left side 36 and right side 38 of the support frame 30. The length of the safety walker is measured along this length axis from the front end 50 to the back entry end 60. The safety walker has a left gate assembly 16 and a right gate assembly 16'. The left gate assembly 16 includes the front left gate 106 coupled to the back left gate 108 by the left gate connector 126. The front left gate 106 extends substantially orthogonal from the left hand support extension 102 proximal the left hand support coupled end 103, or the front of the support frame, to a front right gate extended end 107, and a back left gate 108, extends orthogonally from the left hand support extension 102, proximal the left hand support extended end 104, to a back left gate extended end 109. Likewise, the right gate assembly 16' includes the front left gate 116 coupled to the back left gate 118 by the left gate connector 126. The right hand support 110 has a right hand support extension 112 that extends from the right hand support coupled end 113, coupled with a right hand support frame coupler 111, to a right hand support extended end 114. The right hand support extension extends from the right hand support coupled end, coupled with the support frame proximal the front end 50, toward the back entry end 60. The right hand support extension may extend substantially parallel with the length axis 11 of the support frame 30. The front right gate 116 extends substantially orthogonal from the right hand support extension 112 proximal the right hand support coupled end 113, or the front of the support frame, to a front right gate extended end 117, and a back right gate 118 extends orthogonally from the right hand support extension 112, proximal the right hand support extended end 114, to a back right gate extended end 119. Both the front left and back gates and the right front and back gates are pivotably connected together such that pivoting of a front gate rotates the corresponding back gate. The front left gate 106 is coupled to the back left gate 108 by the left gate connector 126, that may extend through the left hand support extension 102, which may be a conduit. Likewise, the front right gate 116 is coupled to the back right gate 118 by the right gate connector 128, that may extend through the right hand support extension 112, which may be a conduit. Each of the gates can be rotated up, substantially vertical, and out of the way of the open area 64 between the two hand support extensions in an entry configuration as shown in FIGS. 1-3 and 5. Each of the gates can be rotated down, substantially horizontally, and to form a gate across the front and back of the open area in a walking configuration or position. The handles may also rotate down in an entry position, with the extended ends of the front and back gates pointing toward the floor. As shown in FIGS. 4 and 6, the left and right gates are rotated to a walking position, wherein the handles are substantially horizontal and thereby produce a closure, or gate to the entry end 60 and also a closure, or gate, to the front end 50. A person may rotate the back left gate 108 and back right gate 118 up or vertically for entry and then use the front left gate 106 and front right gate 116 to rotate all the gates, including the back gates down into a walking position. A person may then hold onto the front gates and/or the hand support extension to provide stability and enable them to guide the safety walker on the front wheels 35, 35' and back wheels 37, 37'.

The exemplary safety walker has an open area 64 between the left side 36 and right side 38, and a back entry end 60, between the left extended end 46 and right extended end 48, and the front end 50. The open area is the area a person will occupy when walking with the safety walker for support. The front end 50 has a front support frame 51 and one or more cross supports 52. The left hand support 100 and right hand support 110 may be coupled to the support frame by a hand support coupler 54, 54' (Reference to FIG. 1), such as a conduit formed in the frame, which may allow the left hand support frame coupler 101 and right hand support coupler 111 to slide therein and allow adjustability in the height of the left and/or right hand support extension, as indicated by the large double arrow ended line in FIGS. 1 and 2. The hand support coupler 54 may slide into or over a portion of the support frame and a pin or other retainer may be used to secure the hand support frame coupler in a desired position. The support frame may have a series of hand support apertures 55 to receive a retainer for adjustment of the height of the hand supports.

An exemplary safety walker 110 has a fall support 90 that extends from a coupled end 93, coupled with a front end 50 of the support frame 30, to an extended end 94 that is extended toward the entry end 60 of the support frame. The fall support is configured to extend between a person's legs when they are in a walking position within the safety walker. In the event of a fall, the person will be supported by the fall support, as shown in FIG. 6. The fall support may extend along a central length axis 11 and may be configured centrally between the left and right sides of the support frame. The fall support may also be adjustable in height, as indicated by the large double arrow ended line in FIGS. 1 and 2 along the frame fall support extension 59. The coupled end 92 of the fall support may be slidably engaged with the frame fall support extension 59 that has a plurality of fall support apertures 58 to allow the fall support to be moved up and down and be retained by a retainer extending through one of the fall support apertures.

FIG. 1 is shown with the torso support assembly detached to aid in illustration of the other components of the support frame and the gates.

A seat 140 is coupled with the fall support 90 and is vertically adjustable. A seat post 142 is vertically adjustable by a seat height retainer 144 that secures the seat post, and therefore the seat attached thereto, in a desired vertical position to change the height of the seat.

A strap 150 extends from the seat or seat post up to the front support frame 51 and is configured to support a person if they fall and allow them to slide back to the seat 140. The strap extends from a seat end 152 to a frame end 154.

As shown in FIG. 2, the torso support assembly 70 is coupled with the support frame 30 and is configured to pivot from an entry position to a support position around a person in the safety walker. As shown in FIG. 2, the left torso arm 72 and the right torso arm 76 are in an entry position and are pivoted such that the left extended end 74 and right extended end 78 are rotated away from the central length axis 11. The left torso arm extends from a left coupled end 73 to a left coupled end 74 that is extended back from the front end 50 of the support frame toward the entry end 60. Likewise, the right torso arm 76 extends from a right coupled end 77 to a right coupled end 78 that is extended back from the front end 50 of the support frame toward the entry end 60. Each of the left and right torso arms have a curved portion 79 that is curved to enable the torso arm to extend at least partially around a person's torso, such as from the front to the back side of a person. The left and right coupled end of the torso support arms are coupled with a torso support coupler 71 that may be detachably attachable to the support frame and the support arms rotate about a support arm pivot 75. Again, the torso support arms and/or torso support coupler 71 may be adjustable in height along the support frame, as described herein for the fall support or the hand supports. The left and right torso support arms may pivot toward each other from an entry position to a support or walking position. The extended ends are configured to extend around a back or around the back of the torso of a person when in a walking position, or support configuration, with the left and right torso support extended ends rotated toward each other or toward the center length axis 11. The left and right torso support arms may be curved to provide an effective support around a person to prevent a fall. The left and right torso arms may have a concave curvature with respect to the center length axis 11 as shown.

As shown in FIG. 3, an exemplary safety walker 10 has a torso support assembly 70 coupled to the front end 50 of the support frame 30 and is configured in an entry position with the left torso arm 72 and right torso arm 76 rotated away from each other to allow entry into the safety walker open area 64 between the left side 36 and right side 28. Also, the back left gate 108 and back right gate 118 are configured in an entry position to provide an open entry end 60. The strap 150 extends from the seat 140 up to the front support frame 51.

As shown in FIG. 4, the back left gate 108 and back right gate 118 are configured in a walking position and are rotated down or inward to configure the back left gate 108 and back right gate 118 horizontally to create a back closure, or gate to the back entry end 60. The gap distance 120 between the back left gate extended end 109 and back right gate extended end 119 is small enough to prevent a person from falling out of the back of the safety walker 10.

Figure 7:
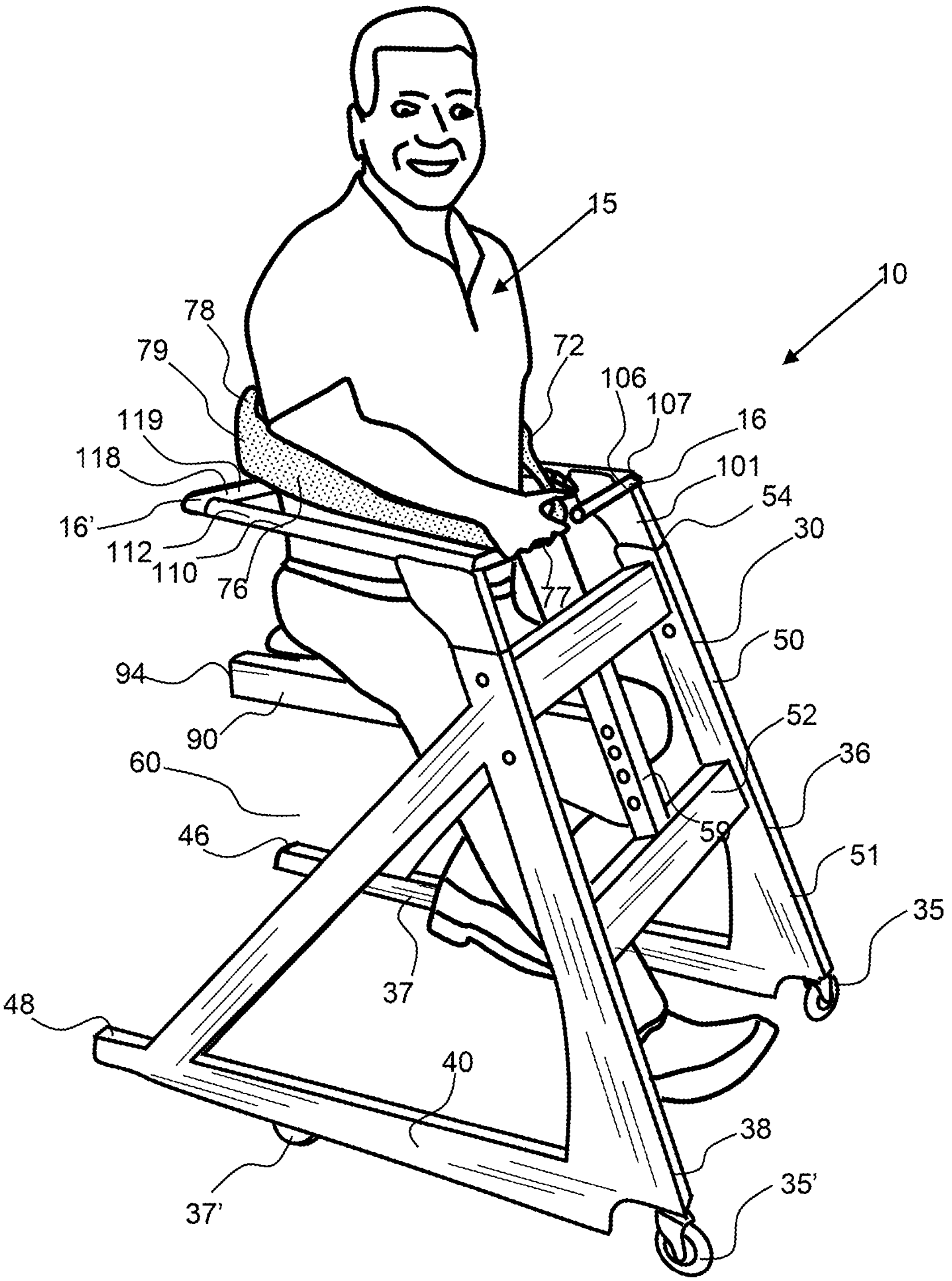
FIG. 7 shows a front side perspective view of the exemplary safety walker shown in FIG. 6, with the person supported, after losing their footing, by the fall support and seat coupled thereto, and the torso support that is supporting their torso.

Referring now to FIGS. 5 to 7, a person 15, may enter the safety walker 10 through the back entry end 60 of the support frame 30, as shown in FIG. 5, the person is holding onto the left hand support extension 102 and right hand support extension 112 as they walk between the left and right sides of the support frame or into the open area 64 therebetween. They enter the safety walker 10 by straddling the seat 140, the fall support 90 and the strap 150. When they are in the open area of the safety walker, they may use the front left gate 106 and front right gate 116 to rotate the gates to a closed or walking position which may also rotate the back left gate 108 and the back right gate 118 respectively, as shown in FIG. 6. Also shown in FIG. 6, the torso support assembly 70 is in a walking position with the left torso arm 72 and the right torso arm pivoted around the person's torso with the left extended end 74 (not shown in FIG. 6) and right extended end 78 configured around the back of the person. The torso support lock 87, shown in FIGS. 5 and 6 may be engaged with, such as by pushing a button, to release the left torso arm 72 and the right torso arm 76 to pivot.

As shown in FIG. 7, the person has lost their footing and they are supported by the fall support 90 and the torso support assembly 70, or more specifically by the left torso arm 72 and the right torso arm 76 extending around their torso, with the curved portion 79 extending around the back of the person. The person is prevented from falling down by the fall support and also prevented from falling laterally, or from side to side, as well as backward and also forward by the torso support assembly 70.

The person may be directed back toward the seat 140 by the strap.

Figure 8:
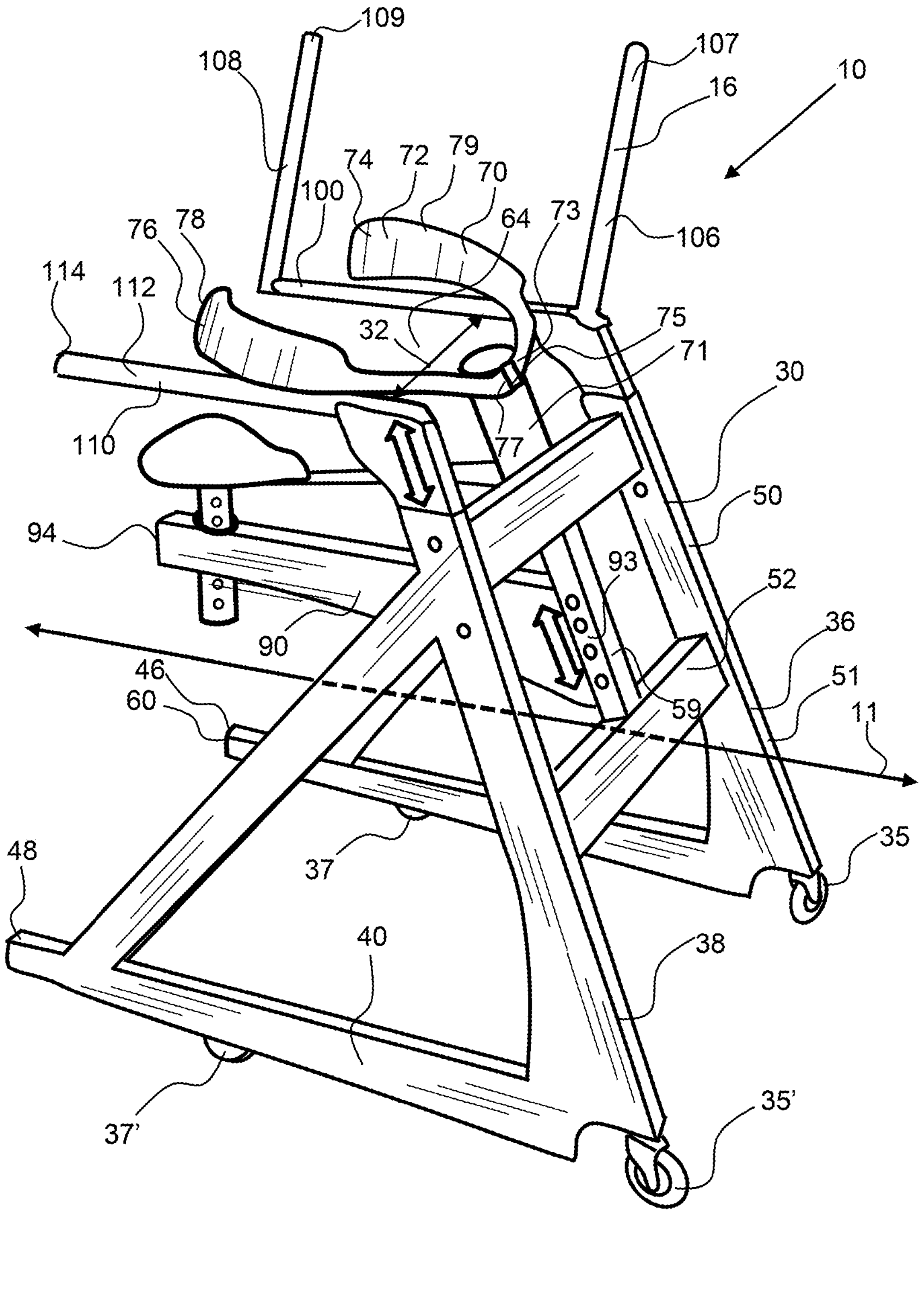
FIG. 8 shows a front side perspective view of an exemplary safety walker having a torso support assembly coupled to the front end of the support frame and comprising a left torso arm and right torso arm configured to pivot together around the torso of a person to provide support about the torso of the person, and a right and left hand support with a left gate assembly with a front left gate and a back left gate that extends substantially across the width 32 of the open area, or at least 60% of the width of the open are.
Figure 9:
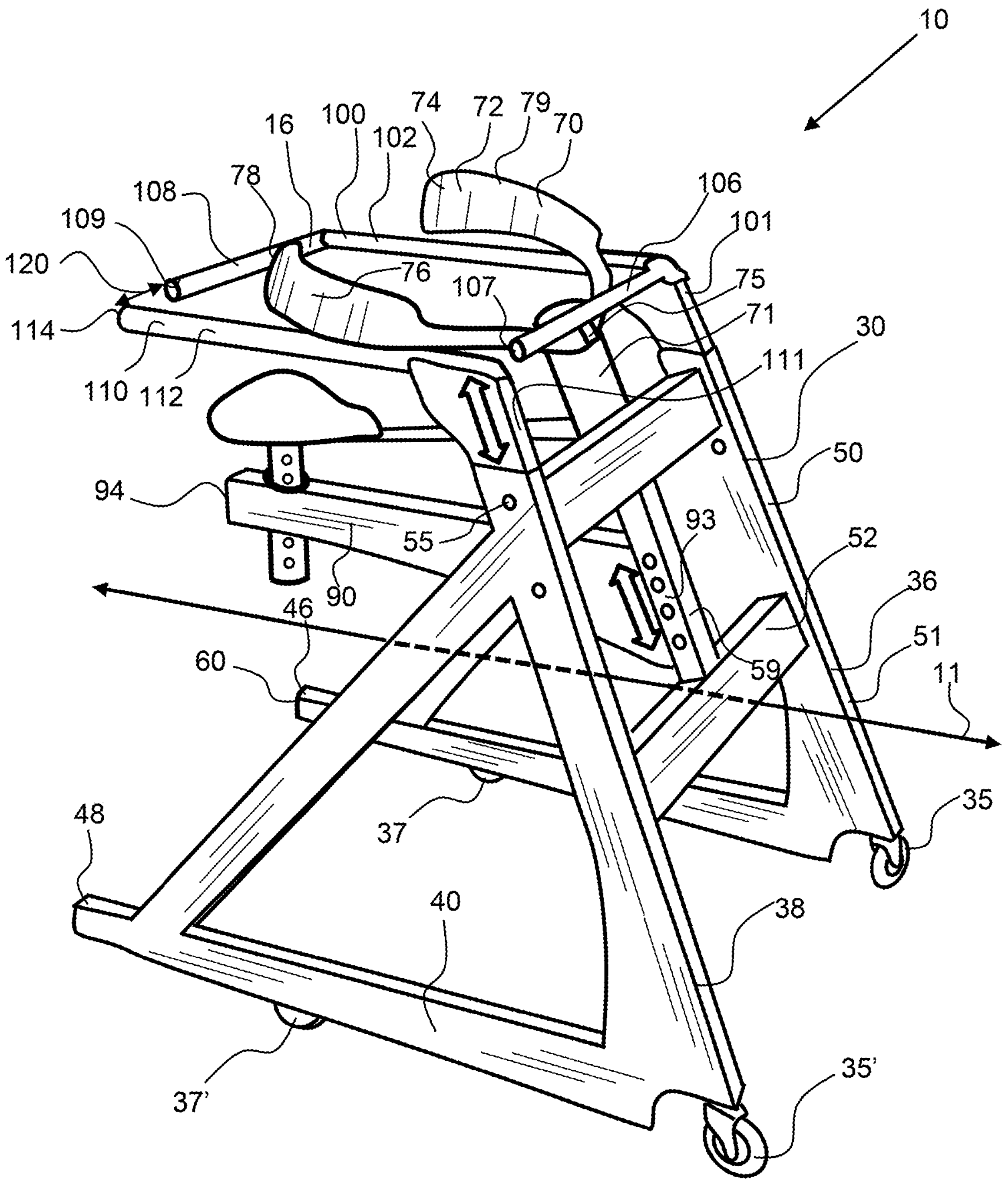
FIG. 9 shows a front side perspective view of the exemplary safety walker shown in FIG. 8, with the left gate assembly rotated to a walking position with the front and back left gates extending across the support frame from the left side to position the extended ends of the back and front left gates proximal the right side of the support frame, proximal to the right hand support.

Referring now to FIGS. 8 and 9, an exemplary safety walker 10 has a torso support assembly 70 coupled to the front end 50 of the support frame 30 by the torso support coupler 71. The left torso arm 72 and right torso 76 arm are configured to pivot together via the torso pivot 75. The exemplary safety walker also has a right hand support 110 and a left hand support 110. The exemplary safety walker 10 has a left gate assembly 16, with a front left gate 106 and a back left gate 108 that are configured to rotate from an entry position to a walking position. As shown in FIG. 9, the back left gate 108 and front left gate 106 are rotated down into a walking position with the front and back left gates extending across the safety walker from a left side 36 toward the right side 38. The front left gate 106 has front right gate extended end 107 that is proximal to the right side or proximal to the right hand support 110 when rotated into a walking position, and likewise, the back left gate 108 has back right gate extended end 109 that is proximal to the right side or proximal to the right hand support 110 when rotated into a walking position. The gap distance 120, or space between the back left gate and the right hand support may be small enough to prevent a person from falling out of the back of the safety walker and may be no more than about 25 cm, no more than about 20 cm, no more than about 15 cm, no more than about 10 cm and any range between and including the gap distance provided.

Figure 10:
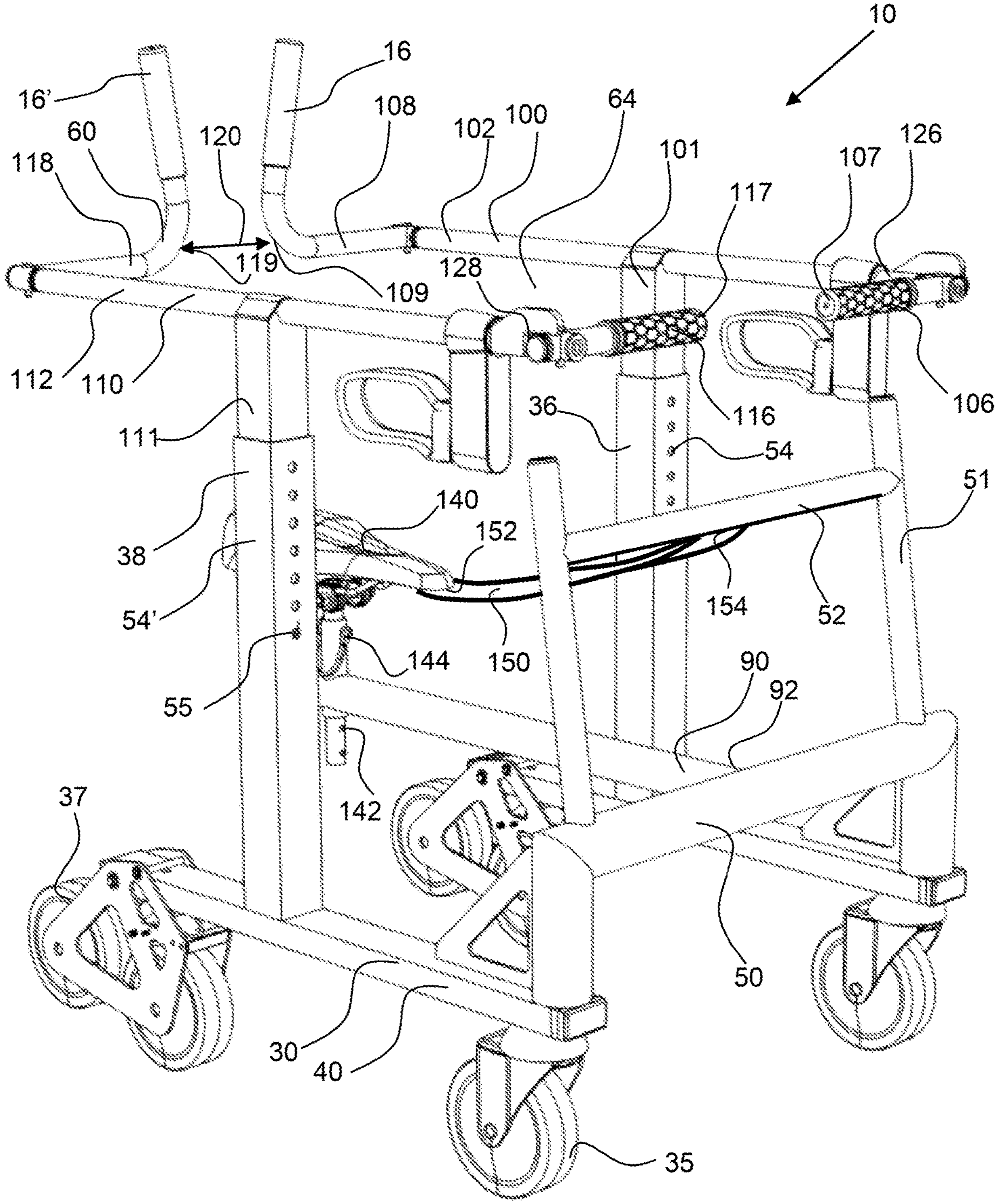
FIG. 10 shows a perspective view of an exemplary safety walker having a left hand support coupled to a left hand support frame coupler and a right hand support coupled to a right hand support frame coupler that are vertically adjustable with the support frame along the left and right side of the support frame.
Figure 11:
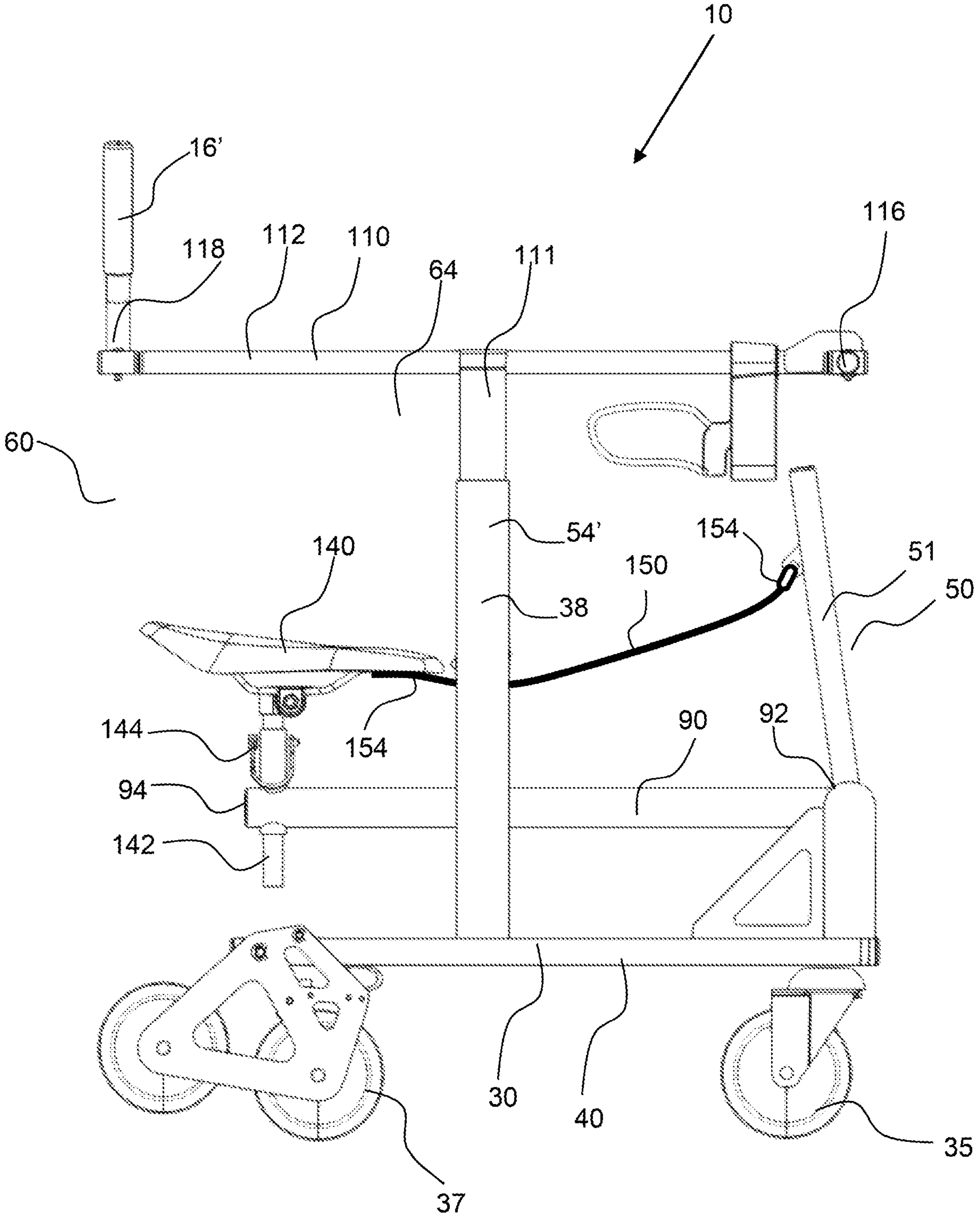
FIG. 11 shows a right side view of the exemplary safety walker shown in FIG. 10 with a strap extending from a front support frame to the seat.
Figure 12:
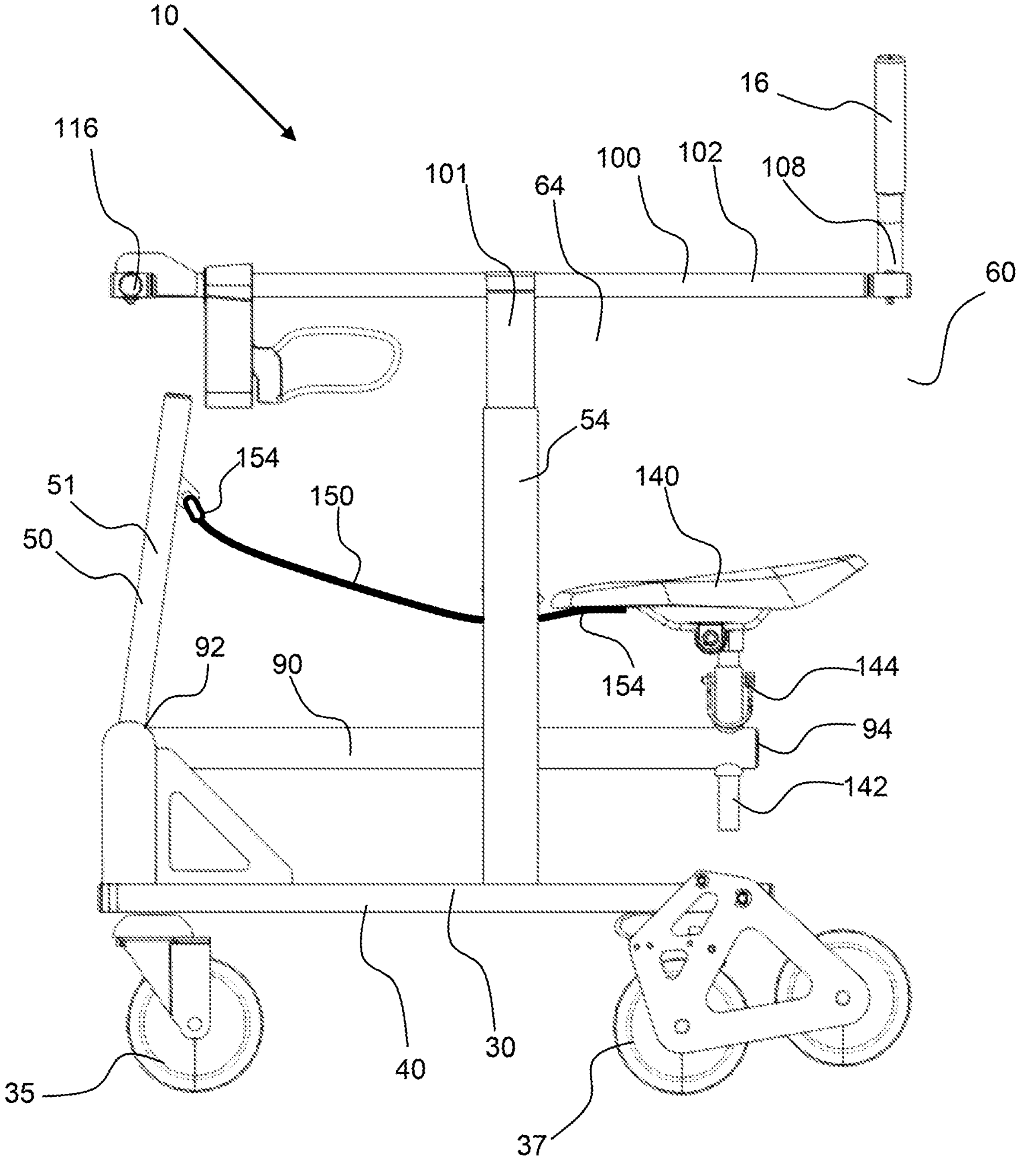
FIG. 12 shows a left side view of the exemplary safety walker shown in FIG. 10 with a strap extending from a front support frame to the seat.
Figure 13:
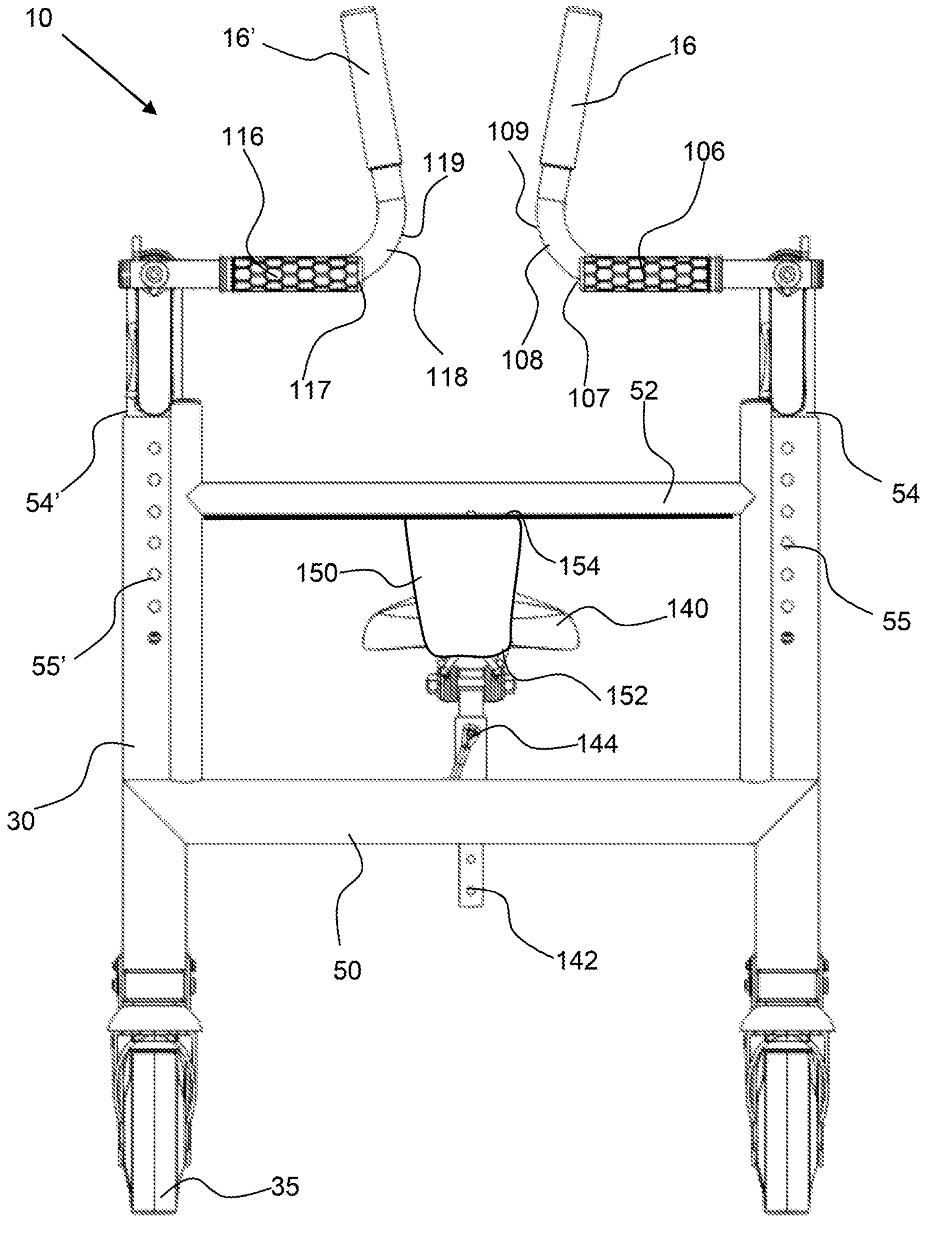
FIG. 13 shows a front view of the exemplary safety walker shown in FIG. 10 with a strap extending from a front support frame to the seat.

Referring now to FIGS. 10 to 14, an exemplary safety walker has a left hand support 100 that is coupled to a left hand support frame coupler 101 that slides down into a hand support coupler 54 of the support frame 30 and is vertically adjustable. Likewise, a right hand support 110 is coupled to a right hand support frame coupler 111 that slides down into a hand support coupler 54' of the support frame 30 and is vertically adjustable. A pin may be inserted through a hand support aperture 55 in the hand support couplers 54, 54' to adjust the vertical position of the left and right hand supports. The exemplary safety walker 10 has both a left gate assembly 16 and a right gate assembly 16'. The back entry end 60 of the safety walker has a back left gate 108 that extends to a back left gate extended end 109, that is the furthest extension toward the centerline 15 (shown in FIG. 14) of the support frame from left side 36 of the support frame. The centerline extends along the center of the support frame along from the front end to the back entry end or along the length axis as defined herein. An additional handle extension extends up from the back left gate when in a walking position as best shown in FIG. 10. The back entry 60 of the safety walker has a back right gate 118 that extends to a back left gate extended end 119 that is the furthest extension toward the centerline 15 (shown in FIG. 14) of the support frame from right side 38 of the support frame. Again, an additional handle extension extends up from the back right gate when in a walking position as best shown in FIG. 10.

A user may grab the handles on the handle extension of the back left and right gates and open them for entry into the open area 64 of the safety walker 10. The back left gate 108 and back right gates 118 may be coupled with the front left gate 106 and front right gate 116, respectively. A left handle connector 126 extends through the left hand support 100 along the left hand support extension 102 to couple the back left gate 108 with the front left gate 106. The front left gate extends to front left gate extended end 107. A right handle connector 128 extends through the right hand support 110 along the right hand support extension 112 to couple the back right gate 118 with the front right gate 116. The front right gate 116 extends to front right gate extended end 117. In this way, the front left and right gates can be rotated to a closed position after entry into the open space to close the back left a right gates. Note that there are handles on the ends of each of the gates for ease of use and to provide better grip when holding onto the gates and moving them from an entry position to a walking position.

Figure 14:
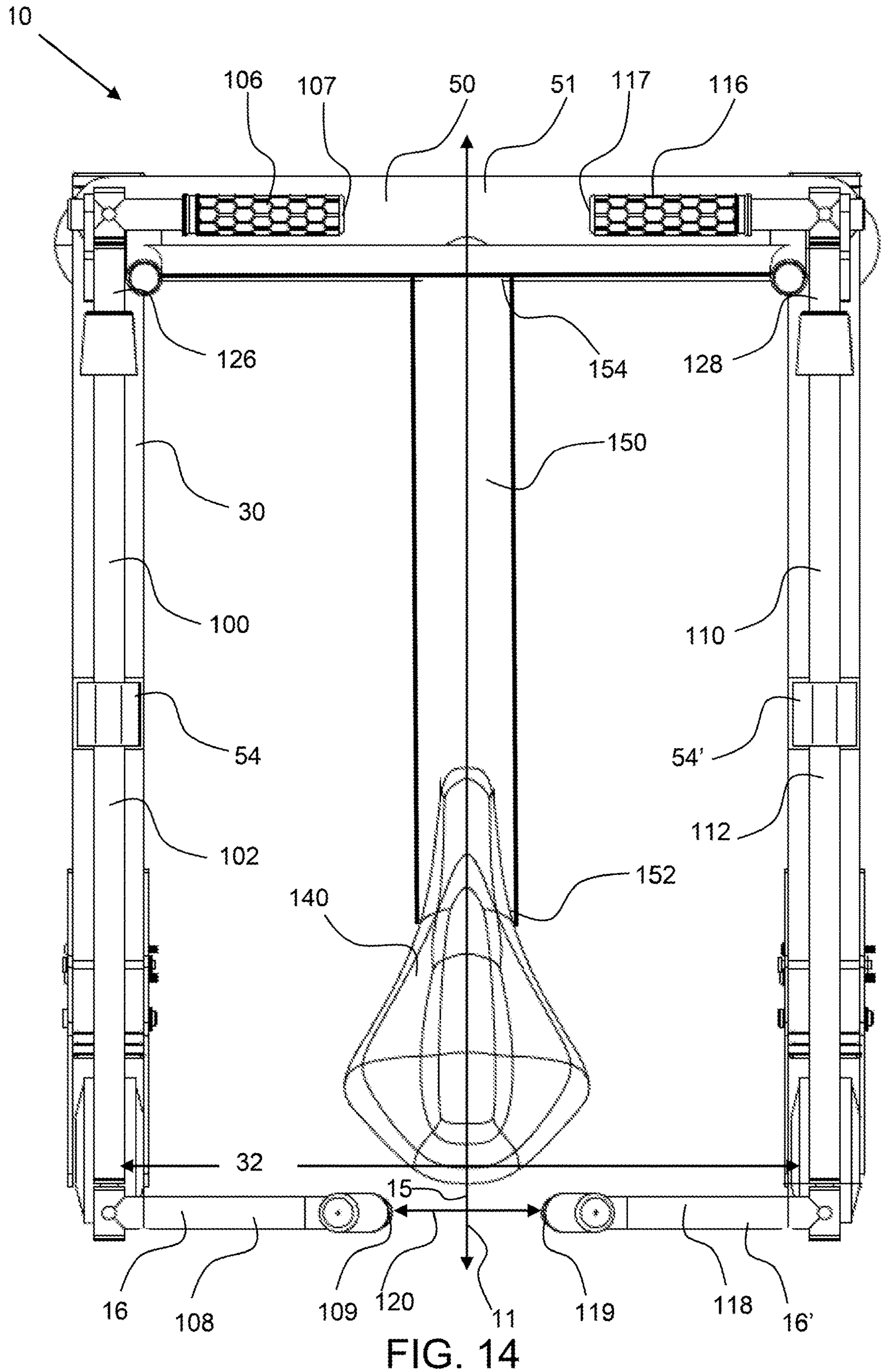
FIG. 14 shows a top view of the exemplary safety walker shown in FIG. 10.

As shown in FIG. 14, the gap distance 120 is the distance between the back left gate extended end 109 and the back right gate extended end 119, the furthest extensions from the left and right sides of the support frame, respectively. The width 32 of the open area is shown in FIG. 14 and the back left and back right gates extend substantially across the width of the open area as defined herein.

The movable support frame 30 has a front end 50 with a front support frame 51 and a cross support 52. The safety walker has a left side 36 and a right side 38. There are front wheels 36 coupled to the frame base 40 proximal the front end 50 and back wheels 37 coupled to the frame base 40 proximal the back entry end 60.

A fall support 90 is coupled at a coupled end 92 with the movable support frame 30 to a cross support 52 of the front support frame 51 and extends back to an extended end. The fall support extends centrally back along the open area 64 between the left side 36 and right side 38. The extended end 94 of the fall support is proximal the back entry end 60 of the safety walker 10.

A seat 140 is coupled with the fall support 90 and is vertically adjustable. A seat post 142 is vertically adjustable by a seat height retainer 144 that secures the seat post, and therefore the seat attached thereto, in a desired vertical position to change the height of the seat.

A strap 150 extends from the seat or seat post up to the front support frame 51 and is configured to support a person if they fall and allow them to slide back to the seat 140. The strap extends from a seat end 152 to a frame end 154.

The exemplary safety walker as shown in FIGS. 10-14 may be configured with a single gate assembly as shown in FIGS. 8 and 9, such as a left or right gate assembly.

Substantially parallel as used herein means within about 30 degrees or parallel and in some cases within about 20 degrees of orthogonal.

Substantially orthogonal as used herein means within about 30 degrees of orthogonal and in some cases within about 20 degrees of orthogonal.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A safety walker comprising:

a) a movable support frame comprising:

i) a base having a plurality of wheels;

ii) a front end having a front support frame;

iii) a left side;

iv) a right side;

v) a back entry end; and vi) an open area extending between the front end and back entry end and extending from the left side to the right side;

b) a plurality of wheels coupled to the movable support frame;

c) a fall support extending from a coupled end, coupled to the movable support frame to an extended end, wherein the fall support extends from the coupled end back toward said back entry end and wherein the fall support is configured between the left side and right side of the movable support frame;

a left hand support having a left hand support extension coupled with the moveable support frame and extending horizontally along a left side of the open area; and a right hand support having a right hand support extension coupled with the moveable support frame and extending horizontally along a right side of the open area;

d) at least one of a left gate assembly or right gate assembly comprising:

a front gate configured proximal to a front end of the movable support frame and extending across a front of the open area to a front gate extended end when in a walking position;

a back gate configured proximal to a back entry end of the movable support frame and extending across a back of the open area to a back gate extended end when in a walking position; and a gate connector extending between and coupling together the front gate and the back gate, whereby rotation of the front gate rotates the back gate, and wherein the front gate and back gate are configured to rotate from an entry position that provides an opening to the back entry end, to a walking position with the both the front gate and back gate forming gates across said front end and a back entry end, respectively, to said open area.

2. The safety walker of claim 1, wherein the gate connector extends through the left or right hand support extension.

3. The safety walker of claim 1, wherein both the left hand support and the right hand support are adjustable in a vertical position with respect to the movable support frame.

4. The safety walker of claim 1, wherein a gap between the front right gate extended and a front left extended end, when configured in a walking position, is no more than 20 cm.

5. The safety walker of claim 1, wherein the gate assembly comprises both a left gate assembly and a right gate assembly, wherein said left gate assembly comprises a left gate connector connecting a front left gate and a back left gate that extend across the open area when in a walking position, and wherein the right gate assembly comprises a right gate connector connecting a front right gate and a back right gate that extend across the open area when in a walking position.

6. The safety walker of claim 5, wherein the left gate connector extends through the left hand support extension.

7. The safety walker of claim 5, wherein the right gate connector extends through right handle support extension.

8. The safety walker of claim 1, further comprising a seat coupled with the movable support frame and configured within the open area proximal the back of the movable support frame.

9. The safety walker of claim 8, wherein the seat is adjustable in height.

10. The safety walker of claim 9, wherein the seat is coupled to the fall support.

11. The safety walker of claim 10, further comprising a fall support strap that extends from the seat to the front support frame.

12. The safety walker of claim 1, wherein the plurality of wheels comprises a pair of front wheels and a pair of back wheels.

* * * * *